United States Patent [19]

Wolfe, Jr.

[11] 4,371,692

[45] Feb. 1, 1983

[54] ELASTOMERIC POLYETHERESTERIMIDES

[75] Inventor: James R. Wolfe, Jr., Wilmington, DE

[73] Assignee: E. I. Du Pont de Nemours and Company, Wilmington, Del.

[21] Appl. No.: 308,130

[22] Filed: Oct. 2, 1981

[51] Int. Cl.³ .................. C08G 69/44; C08G 73/16
[52] U.S. Cl. .................... 528/289; 525/438; 528/292; 528/296; 528/301
[58] Field of Search ........... 528/289, 296, 301, 292; 525/438

[56] References Cited

U.S. PATENT DOCUMENTS

| | | | |
|---|---|---|---|
| 3,274,159 | 9/1966 | Kluiber | 528/296 X |
| 3,458,480 | 7/1969 | Schmidt et al. | 528/289 |
| 3,784,520 | 1/1974 | Hoeschele | 528/274 X |
| 3,852,246 | 12/1974 | Schmidt et al. | 528/289 |
| 4,205,158 | 5/1980 | Hoeschele | 528/296 |
| 4,321,341 | 3/1982 | Neuberg et al. | 528/296 X |

*Primary Examiner*—Lucille M. Phynes

[57] ABSTRACT

Thermoplastic elastomeric polyetheresterimidescomprising a multiplicity of long chain esterimide units being represented by the formula

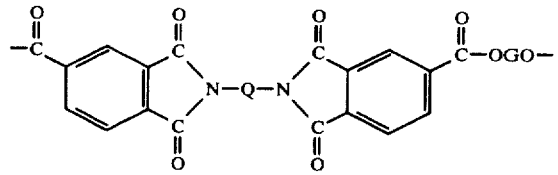

and short chain esterimide units being represented by the formula

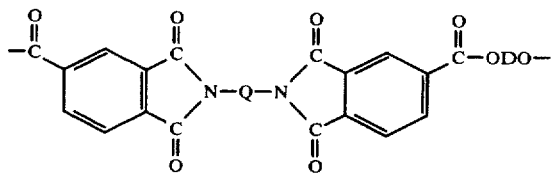

where G is a divalent radical remaining after the removal of terminal hydroxyl groups from a poly(alkylene oxide) glycol having a number average molecular weight of about 400–4000; D is a divalent radical remaining after the removal of hydroxyl groups from a diol having a molecular weight less than about 300 and Q is a divalent radical remaining after removal of amino groups from an aliphatic primary diamine having a molecular weight less than 350; with the provisos that from about 0.5 to 5 of said short chain esterimide units are present for each of said long chain esterimide units and that said polyetheresterimide has a softening point of at least 160° C.

7 Claims, No Drawings

ELASTOMERIC POLYETHERESTERIMIDES

BACKGROUND OF THE INVENTION

Thermoplastic copolyetherester elastomers, such as those disclosed in U.S. Pat. No. 3,766,146, are known for their generally good physical properties and their outstanding processing characteristics. Unfortunately, these copolyetheresters are deficient in scuff resistance which reduces their suitability in certain applications. Moreover, lower hardness grades of copolyetheresters lack toughness; for instance, their tensile and tear strengths are often lower than desired.

Japanese patent application publication No. 44-20477 describes elastic polymers which are prepared by polycondensation of about equimolar amounts of a diimide-diacid and a poly(alkylene oxide) glycol. This disclosure exemplifies the use of diimide-polyether copolymers in fibers. As is known, the drawing which forms a part of the spinning process results in orientation and increased crystallinity within a polymer. In molding operations, it is not possible to take advantage of the property improvements resulting from drawing. It has been found that the polymers of Japanese No. 44-20477 are generally unsatisfactory for use in molded goods because of poor stress-strain properties, low softening points and poor solvent resistance.

A new class of polymers containing diimide-diacid segments and polyether segments has been found. The polymers are thermoplastic elastomers which have outstanding scuff resistance, low permanent set and excellent stress-strain properties even at low hardnesses.

SUMMARY OF THE INVENTION

The present invention is directed to a thermoplastic elastomeric polyetheresterimide comprising a multiplicity of long chain esterimide units being represented by the formula

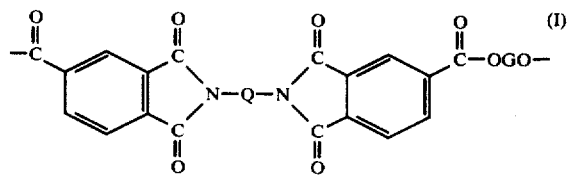

and short chain esterimide units being represented by the formula

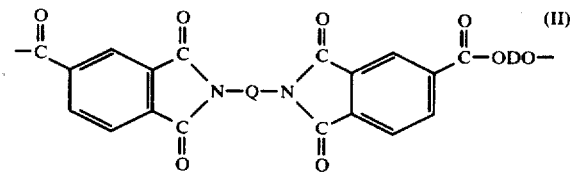

where G is a divalent radical remaining after the removal of terminal hydroxyl groups from a poly(alkylene oxide)glycol having a number average molecular weight of about 400-4000; D is a divalent radical remaining after removal of hydroxyl groups from a diol having a molecular weight less than about 300 and Q is a divalent radical remaining after removal of amino groups from an aliphatic primary diamine having a molecular weight of less than 350; with the provisos that from about 0.5 to 5 of said short chain esterimide units are present for each of said long chain esterimide units and that said polyetheresterimide has a softening point of at least 160° C. These elastomers can be used in many applications in which thermoplastic elastomers are used. They are especially useful as cable, belt and hose coverings where scuff resistance is important.

DETAILED DESCRIPTION

The polymers of this invention comprise two recurring types of structural units in a specified molar ratio. The units represented by the general formula

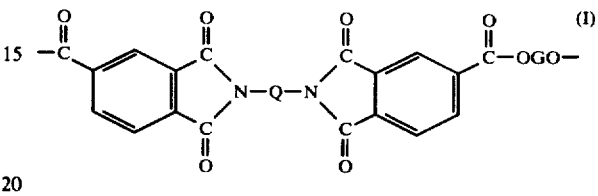

will be referred to as "long chain esterimide units", and those represented by

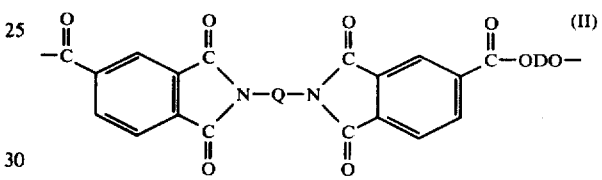

will be referred to as "short chain esterimide units".

Both the long chain and the short chain esterimide units contain a diimide-diacid radical which can be obtained by reacting two moles of trimellitic anhydride with an aliphatic primary diamine. As will be explained in greater detail hereinafter, the diimide-diacid or an ester-forming equivalent can be prepared in a separate step prior to polymerization or it can be prepared during the polymerization.

Diamines which can be used to provide the —Q— radicals in the polymers of this invention are aliphatic (including cycloaliphatic) primary diamines having a molecular weight of less than about 350, preferably below about 250. Diamines containing aromatic rings in which both amino groups are attached to aliphatic carbons, such as p-xylylene diamine, are also meant to be included. Representative aliphatic (and cycloaliphatic) primary diamines are ethylene diamine, 1,2-propylene diamine, methylene diamine, 1,3- and 1,4-diaminocyclohexane, 2,4- and 2,6-diaminomethylcyclohexane, m- and p-xylylene diamine and bis(4-aminocyclohexyl)methane. Of these diamines, ethylene diamine and bis(4-aminocyclohexyl)methane are preferred because they are readily available and yield polymers having excellent physical properties.

Low molecular weight diols which can be used to provide the —D— radicals are aliphatic diols having a molecular weight of less than 250, preferably below about 150. Ester-forming equivalents of diols such as esters are also meant to be included, with the understanding that the molecular weight limitation pertains to the diol and not to its ester-forming equivalents. Included among the low molecular weight diols are aliphatic (including cycloaliphatic) dihydroxy compounds. Preferred are diols with 2-15 carbon atoms such as ethylene, 1,2- and 1,3-propylene, isobutylene, tetramethylene, pentamethylene, 2,2-dimethyltrimethylene, hexamethylene and decamethylene glycols, 1,3- and 1,4-dihydroxycyclohexane and cyclohexane dimethanol. Ethylene glycol, 1,2-propylene glycol and 1,4-butanediol are especially preferred for providing the —D— radicals in the polymers of this invention because of their availability.

Polyether glycols from which the —G— radicals are derived have number average molecular weights of 400–4000. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide and random or block copolymers of tetrahydrofuran with minor amounts of a second monomer such as ethylene oxide, propylene oxide or methyltetrahydrofuran. Poly-formal glycols prepared by reacting formaldehyde with diols such as 1,4-butanediol and 1,5-pentanediol are also useful. Preferred polyether glycols are poly(tetramethylene oxide) glycol having a number average molecular weight of 600–2200 and ethylene oxide-capped poly(propylene oxide) glycol having a number average molecular weight of 600–2800 and containing 5–35% by weight of ethylene oxide because they yield polymers with good properties.

The amounts of monomers employed in preparing the polymers of the present invention must be selected so that the finished polymer contains from about 0.5 to 5 short chain esterimide units per long chain esterimide unit. Polymers containing less than about 0.5 short chain esterimide units per long chain esterimide unit are generally characterized by poor stress-strain properties, low softening points and poor solvent resistance. Such polymers are representative of prior art polymers described in Japanese patent application publication No. 44-20477 which discloses polymers having a maximum of 0.25 short chain esterimide units per mole of long chain esterimide unit. As the proportion of short chain esterimide units is increased over the range of from about 0.5 to 5, increases in modulus, tensile strength, tear strength, solvent resistance and softening point are observed while elongation decreases. Scuff resistance is excellent over the entire range. At ratios of short chain to long chain esterimide units greater than about 5, the elastomeric character of the polymers decreases.

The polymers of this invention are further characterized in that they must have softening points of at least 160° C. The procedure employed to determine the softening point is described in detail in the examples. In essence, the softening point is a measure of the temperature at which an annealed polymer sample loses its ability to resist the pull of a standard load. Polymers having softening points of at least 180° C. are preferred. Softening of the polymers of this invention does not take place sharply, but instead occurs over a temperature range of about 4°–10° C. With regard to the 160° C. limit, polymers having softening point ranges which include 160° C. or are completely above 160° C. are meant to be within the scope of the present invention. The same interpretation of the softening point range applies to the preferred 180° C. limit.

The polymers of the present invention can be prepared readily by melt condensation procedures. Typically, the procedure involves the reaction in the presence of a titanate catalyst of a diimide-diacid or an ester thereof with a mixture of a poly(alkylene oxide) glycol and a low molecular weight diol, the latter being present in a molar excess. Initially, reaction takes place at about atmospheric pressure while the temperature is increased up to about 240°–300° C. while distilling off volatiles. The resulting prepolymer of relatively low molecular weight can be converted to a high molecular weight polymer by continuing the reaction at 240°–300° C. at reduced pressures, preferably less than 670 Pa and more preferably at less than 250 Pa.

The typical procedure can be varied because it is possible to preform the diimide-diacid or ester thereof in a separate step prior to initiating the melt condensation or to form the diimide-diacid or ester thereof during the course of the melt condensation.

The most convenient synthesis for preforming a diimide-diester involves heating about 2 moles of trimellitic anhydride for each mole of aliphatic diamine in an excess of the low molecular weight diol to be used in the polymer ultimately desired. The reaction mixture should contain an esterification catalyst, such as a titanate ester. The reaction is completed by boiling while slowly removing distillate to insure that esterification is completed. On cooling, the desired product precipitates and can be collected by filtration. The product is ready for use as such in the melt condensation step. If desired, the product can be dried before use. Synthesis of diimide-diacids, which are less preferred for use in the melt condensation, can be accomplished by reacting 2 moles of trimellitic anhydride per mole of diamine by refluxing in a suitable solvent such as glacial acetic acid. The diacid is recovered by cooling the reaction mass and filtering. Preparation of diimide-diacids or their esters is not meant to be limited to the procedures just described which are illustrative of synthetic methods known in the art.

When preparing the polymers of this invention by the procedure in which the diimide-diacid or ester thereof is formed during the course of the melt condensation, trimellitic anhydride and the aliphatic diamine are charged in place of the preformed diimide-diacid or its ester along with the other ingredients. From then on, the melt condensation is conducted in substantially the same manner as previously described. In theory, two moles of trimellitic anhydride react with one mole of diamine; however, when the diimide-diacid is prepared in the presence of the low molecular weight diol and the poly(alkylene oxide) glycol, a minor amount of trimellitic anhydride reacts with available hydroxyl groups and ultimately functions as a branching agent in the finished polymer. Within limits, the degree of branching in the finished polymer can be controlled by varying the mole ratio of trimellitic anhydride to aliphatic diamine. An excess of diamine reduces the degree of branching, while an excess of the anhydride increases branching. Ratios of 2 moles of trimellitic anhydride to 0.85–1.15 moles of diamine have been found to yield useful polymers. In addition to controlling branching by varying the anhydride/diamine mole ratio, one can compensate for branching by introducing a monofunctional reactant such as benzoic acid in minor amounts.

With reference to branching, it should be noted that polymers of this invention, when prepared from preformed diimide-diesters, are substantially free of branching. If branching is desired, one needs only to introduce a branching agent, such as trimellitic anhydride, along with the preformed diimide-diester. The amount of branching agent generally will be less than 0.15 moles per mole of diimide-diacid or ester thereof. Useful branching agents other than trimellitic anhydride include trimethyl trimellitate, glycerol, trimethylol propane, trimesic acid and its esters and the like.

It is customary to employ a catalyst while carrying out the melt condensation. While a variety of catalysts can be employed, organic titanates such as tetrabutyl titanate used alone or in combination with magnesium acetate or calcium acetate are preferred. The catalyst should be present in amounts of about 0.005 to 2.0 percent by weight based on the total reactants.

Both batch and continuous methods can be used for any stage of polymer preparation. Further polymerization of lower molecular weight polymers can also be accomplished in the solid phase by heating solid polymer particles in a vacuum or in a stream of inert gas to remove liberated low molecular weight diol. This method reduces thermal degradation because it must be used at temperatures below the softening point of the polymer.

The preparation of the polymers of this invention can be carried out in the presence of an antioxidant. While antioxidants are not normally required on a laboratory scale, their use is preferred on a commercial scale.

The diimide-diacid or its ester-forming equivalents and the poly(alkylene oxide) glycol are incorporated in the polymers of this invention in the same molar proportions as are present in the initial reaction mixture. The amount of low molecular weight diol actually incorporated corresponds to the difference between the moles of diimide-diacid and the moles of polyether glycol. When mixtures of low molecular weight diols are used, the proportion of each diol incorporated is largely a function of the amounts of the diols present, their boiling points, and relative reactivities.

Although the polymers of this invention possess many desirable properties, it is sometimes advisable to stabilize certain of the compositions to heat or radiation by ultraviolet light. Fortunately, this can be done readily by incorporating stabilizers. Satisfactory stabilizers comprise phenols and their derivatives, amines and their derivatives, compounds containing both hydroxyl and amine groups, and polymeric phenolic esters.

Representative phenol derivatives useful as stabilizers include N,N'-hexamethylenebis(3,5-di-tert-butyl-4-hydroxyhydrocinnamamide), 4,4'-bis(2,6-ditertiary-butylphenol), 1,3,5-trimethyl-2,4,6-tris[3,5-ditertiary-butyl-4-hydroxybenzyl]benzene and 4,4'-butylidenebis(6-tertiary-butyl-m-cresol). Typical amine stabilizers include 4,4'-bis(α,α-dimethylbenzyl)diphenylamine, N,N'-bis(beta-naphthyl)-p-phenylenediamine, N,N'-bis(1-methylheptyl)-p-phenylenediamine and either phenyl-beta-naphthylamine or its reaction products with aldehydes. Mixtures of hindered phenolic or amine stabilizer with esters of thiodipropionic acid, mercaptides and phosphite esters are particularly useful. Additional stabilization to ultraviolet light can be obtained by compounding with various UV absorbers such as substituted benzophenones or benzotriazoles. Hindered amine photostabilizers such as bis(1,2,2,6,6-pentamethyl-4-piperidinyl) n-butyl (3,5-di-tert-butyl-4-hydroxybenzyl)malonate are also useful.

The properties of these polymers can be modified by incorporation of various conventional inorganic fillers such as carbon black, silica gel, alumina, clays and chopped fiberglass. In general, these additives have the effect of increasing the modulus of the material at given elongations. Compounds having a range of hardness values can be obtained by blending hard and soft polymers of this invention.

The polyetheresterimides of this invention are particularly outstanding in their scuff resistance. In addition, the polymers have excellent stress-strain properties even at low hardnesses which sets them apart from prior art thermoplastic elastomers. The polymers also exhibit high softening temperatures, low permanent set, good low temperature properties and high solvent resistance. Thus the polymers are useful in many end uses which have been filled by prior art thermoplastic elastomers. Moreover, their outstanding scuff resistance makes the present polyetheresterimides particularly useful in applications such as cable, belt and hose coverings where resistance to scraping, cutting and gouging is important.

Processing of the polyetheresterimides is possible by typical molding and extrusion techniques. The materials can be injection, compression, transfer and blow molded to form a variety of articles. They can be extruded to form films, tubing and other forms of more complex cross-sections. They can be crosshead extruded for hose, wire and cable covers. They can be calendered to produce films and sheets or to produce calender-coat fabrics or belts. In finely divided form, they can be used in rotational molding and powder coating techniques.

EXAMPLES

Polymer Test Methods

Copolymer inherent viscosities were determined at 30° C. at a concentration of 1 g/L in m-cresol. Test methods used on compression molded slabs were:

| | |
|---|---|
| stress at 100% and 300% elongation at 8.5 mm/s | ASTM D412 |
| tensile strength at break at 8.5 mm/s | ASTM D412 |
| elongation at break at 8.5 mm/s | ASTM D412 |
| permanent set 300 s after break | ASTM D412 |
| Clash-Berg torsional modulus | ADTM D1043 |
| trouser tear strength at 21 mm/s | ASTM D1938 |
| Shore hardness | ASTM D2240 |

Stress-strain measurements in Examples 1 and 2 were run using dumbbells 89 mm long having tab ends 16 mm wide and a central narrow portion 6.4 mm wide by 32 mm long died from slabs about 0.64 mm thick. Stress-strain measurements in Examples 3 and 4 were run using die C dumbbells about 1.9 mm thick. Trouser tear strength measurements were made on samples 38 mm × 76 mm × 0.64 slit lengthwise 38 mm up the center. Other tests were run on samples obtained from molded slabs about 1.9 mm in thickness. All melting points are uncorrected.

Softening temperature measurements were carried out on "O" rings which were 33 mm O.D. × 25 mm I.D. died out of about 0.64 mm thick molded slabs which had been annealed for 16 hours at 90° C. The "O" ring sample was suspended from a glass hook inside a glass tube 430 mm long × 35 mm O.D. A weight was suspended from the bottom of the "O" ring by means of a long glass rod with hooks at both ends. The glass rod plus attached weight totaled 11 g. The rod passed freely through a hole in a fluorocarbon resin stopper inserted in the bottom of the glass tube. A similar stopper at the top of the glass tube supported the upper glass hook. A thermocouple was positioned inside the glass tube close to the "O" ring. The glass tube was enclosed in a vertical position within a 330 mm long tube furnace. The furnace was heated at a rate sufficient to raise the temperature of the "O" ring 14° C./60 s. For most samples there was a slow creep as the temperature was increased. Eventually the "O" rings began to stretch rapidly. The temperature at which rapid stretch began was noted as the beginning of the softening-temperature range. The end of the softening-temperature range was noted either when the "O" ring had elongated 140 mm or when the "O" ring broke, whichever came first.

Scuff resistance was estimated by pressing the sharp edge of the curved portion of a No. 10 "X-acto" knife blade in a fountain-pen type holder against the surface of a 1.9 mm compression-molded slab and rapidly drawing the blade across the polymer surface while pressing the sharp edge of the blade forcefully against the surface. The long axis of the blade is held perpendicular to the direction of draw, thus providing a scraping action rather than a cutting action. The blade was held perpendicular to the surface of the slab. Scuffing is evidenced by the formation of a rough to-the-touch surface along the path of the blade. A smooth surface path indicates no scuffing.

General Procedure for Melt Condensations

The polymerizations were carried out in 500 ml glass resin kettles equipped with stainless steel paddle stirrers having a shape conforming to the bottom of the flasks. The stirrers were placed close to the bottom of the flasks. Some polymerizations were carried out using stirrers with a baffle. The baffle consisted of a circular disc of stainless steel attached to the stirrer shaft about three-fourths of the distance from the bottom to the top of the resin-kettle bottom section. There was a 6 mm gap between the edge of the baffle and the inside wall of the resin kettle. The heads of the resin kettles had three ports: a stoppered port for catalyst addition; a port containing a vacuum-tight, stirrer-shaft bearing; and a port leading to a cooled trap and a vacuum system.

After the polymerization ingredients were placed in the bottom of a resin kettle, the apparatus was assembled with a fluoroelastomer O-ring between the resin-kettle head and bottom. The assembly was clamped together and then alternately evacuated and filled with nitrogen 4 times. Polymerization catalyst was added to the contents of the flask. The bottom section of the resin kettle was immersed in a heating bath and the polymerization ingredients stirred at the times and temperatures specified in the examples. The kettle was then evacuated to a low pressure. The polymerizations were completed by stirring the reaction mixtures at reduced pressure while at high temperature.

All of the polymerizations were carried out in the presence of the antioxidant N,N'-hexamethylenebis(3,5-di-tert-butyl-4-hydroxyhydrocinnamamide) which was placed in the resin kettle at the same time as the polymerization monomers. Polymerization catalyst was tetrabutyl titanate added either neat or as a 5% (vol) solution in 1,4-butanediol.

Preparation of Preformed Diimide-Diesters

Diimide-Diester of Ethylene Diamine, Ethylene Glycol and Trimellitic Anhydride

A mixture of ethylene glycol (2000 ml), ethylene diamine (1 mol), trimellitic anhydride (2 mol) and tetrabutyl titanate (2 ml) was heated at the boil for 24 hours while 330 ml of distillate boiling below 196° C. was gradually collected. The final reflux temperature of the reaction mixture was 195° C. After cooling, there was collected by filtration 468 g (0.94 mol) 94% yield of product melting 213°–218° C. after drying.

Diimide-Diester of Bis(4-aminocyclohexyl)methane (70%-trans, trans), 1,2-Propanediol and Trimellitic Anhydride A mixture of 1,2-propanediol (2100 ml), bis(4-aminocyclohexyl)methane (70%-trans, trans) (1.2 mol), trimellitic anhydride (2.4 mol) and tetrabutyl titanate (1.0 ml) was heated at the boil for 24 hours while about 400 ml of distillate boiling below 185° C. was gradually collected. The final reflux temperature of the reaction mixture was 184° C. After cooling, there was collected by filtration 758 g (1.1 mol) 94% yield of product melting 206°–213° C. after drying.

EXAMPLE 1

Polyetheresterimide Polymers From Poly(tetramethylene ether) Glycols, Bis(4-aminocyclohexyl)methane (70%-trans, trans), 1,2-Propanediol and Trimellitic Anhydride Two polymerizations were carried out using the polymerization monomers listed in Table I. There were also employed in each polymerization 0.3 g of antioxidant and 0.8 ml of catalyst solution. The resin kettles were initially placed in baths at about 200° C. which were then heated to about 250° C. over a period of about 156 minutes. The kettles were then evacuated to a pressure of 8 Pa or less over a period of about 40 min. The polymerizations were continued for an additional period of about 40 min at about 250° C. and 8 Pa or less before the polyetheresterimide polymers were recovered.

The polymer test slabs were compression molded at about 232° C. The properties of the polymers are listed in Table I.

TABLE I

| Polyetheresterimide Polymers Based on Bis(4-aminocyclohexyl)methane (70%-trans, trans) | | |
|---|---|---|
| Polymer | A | B |
| Monomers | | |
| Bis(4-aminocyclohexyl)methane (70%-trans, trans), moles | 0.0437 | 0.0475 |
| Trimellitic anhydride, moles | 0.0874 | 0.0947 |
| Poly(tetramethylene ether) glycol (mol. wt. 1015), moles | 0.0069 | 0.0069 |
| Poly(tetramethylene ether) glycol (mol. wt. 2078), moles | 0.0130 | 0.0130 |
| 1,2-Propanediol, moles | 0.15 | 0.15 |
| Short/Long Chain Esterimide Unit Mole Ratio | 1.2 | 1.4 |
| Polymer Properties | | |
| Inherent viscosity, dL/g | 1.26 | 1.61 |
| $M_{100}$, MPa | 5.8 | 6.3 |
| $M_{300}$, MPa | 6.9 | 7.7 |
| Tensile strength, MPa | 14.1 | 34.1 |
| Elongation, % | 550 | 730 |
| Permanent set, % | 29 | 44 |
| Trouser tear, kN/m | 82 | 93 |
| Shore A hardness | 86 | 90 |
| Softening temperature, °C. | >195 | >200 |
| Scuff resistance test | No scuffing | No scuffing |

EXAMPLE 2

Polyetheresterimide Polymer From Ethylene Oxide Capped Poly(oxypropylene) Glycol and the Diimide-Diester of Bis(4-aminocyclohexyl)methane (70%-trans, trans), 1,2-Propanediol and Trimellitic Anhydride The polymerization monomers were as follows:

| | |
|---|---|
| polyether glycol block copolymer of number-average molecular weight 1175 consisting of about 90% (wt.) of a poly(oxypropylene) center block and about 10% of poly(oxyethylene) end groups terminated by hydroxyl. ("Pluronic" L31, Wyandotte Chemical Co.) | 22.0 g (0.0187 mol) |
| diimide-diester of bis(4-aminocyclohexyl)methane (70%-trans, trans) 1,2-propanediol and trimellitic anhydride | 27.0 g (0.040 mol) |
| 1,2-propanediol | 7.6 g (0.10 mol) |

The calculated short/long chain esterimide unit ratio was 1.1. There were employed in the polymerization 0.2 g of antioxidant and 0.8 ml of catalyst solution.

The resin kettle was initially placed in a bath heated to about 190° C. The bath was gradually heated to 250° C. over a period of 56 minutes. The kettle was then evacuated to a pressure of about 4 Pa. After stirring an additional 145 minutes at about 250° C. and 4 to 5 Pa, there was recovered 38 g of polymer having the properties listed below:

| | |
|---|---|
| inherent viscosity, dL/g | 1.02 |
| stress at 100% elongation, MPa | 6.6 |
| stress at 300% elongation, MPa | 6.5 |
| tensile strength at break, MPa | 11.4 |
| elongation at break, % | 760 |
| permanent set at break, % | 39 |
| trouser tear strength kN/m | 91 |
| Shore D hardness | 35 |
| softening temperature, °C. | >184 |
| scuff resistance test | No scuffing |

Test samples were compression molded at 232° C.

EXAMPLE 3

Polyetheresterimide Polymers From Poly(tetramethylene ether) Glycol and the Diimide-Diester of Ethylene Diamine, Ethylene Glycol and Trimellitic Anhydride Four polymerizations were carried out using a stirrer with a baffle. The polymerization monomers were the diimide-diester of ethylene diamine, ethylene glycol and trimellitic anhydride and as the polyether glycol, poly(tetramethylene ether) glycol of number-average molecular weight 963. The amounts of each monomer in each polymerization are shown in Table II. There were employed in each polymerization 0.6 g of antioxidant and 0.2 ml of neat catalyst.

The resin kettles were initially placed in baths at about 220° C. which were then heated to about 270° C. over a period of about 75 minutes. The kettles were then evacuated over a period of 3 to 11 min to a pressure of 12 Pa or less. The polymerizations were continued for a period of 30 to 46 min at about 270° C. and 12 Pa or less before the polyetheresterimide products were recovered.

The polymer test slabs were compression molded at 260° C. The properties of the polymers are listed in Table II.

TABLE II

Polyetheresterimide Polymers Based on Ethylene Diamine

| Polymer | C | D | E | F |
|---|---|---|---|---|
| Monomer | | | | |
| Diimide-diester, moles | 0.12 | 0.12 | 0.13 | 0.14 |
| Polyether glycol, moles | 0.096 | 0.08 | 0.0743 | 0.07 |
| Short/Long Chain Esterimide Unit Ratio | 0.25 | 0.5 | 0.75 | 1.0 |
| Polymer Properties | | | | |
| Inherent viscosity, dL/g | 1.81 | 1.74 | 1.48 | 1.69 |
| $M_{100}$, MPa | 0.9 | 1.4 | 2.1 | 3.8 |
| $M_{300}$, MPa | 1.0 | 1.9 | 3.2 | 7.2 |
| Tensile strength MPa | >9.5 | 28.6 | 32.8 | 31.0 |
| Elongation, % | >1120 | 815 | 790 | 635 |
| Permanent set, % | >75 | 10 | 10 | 16 |
| Shore A hardness | 57 | 60 | 69 | 82 |
| Shore D hardness | 14 | 18 | 24 | 35 |
| Softening temperature, °C. | 119–123 | 160–167 | 185–194 | >200 |
| Volume swell ASTM #3 oil 7 days/100° C. | 53 | 41 | 32 | 26 |

Polymers D, E and F do not scuff. Polymer C which softens below 160° C. is representative of the prior art.

EXAMPLE 4

Polyetheresterimide Polymers From Poly(tetramethylene ether) Glycol and the Diimide-Diester of Bis(4-aminocyclohexyl)methane (70%-trans, trans), 1,2-Propanediol and Trimellitic Anhydride Four polymerizations were carried out using as polymerization monomers the diimide-diester of bis(4-aminocyclohexyl)methane (70%-trans, trans), 1,2-propanediol, and trimellitic anhydride and as the polyether glycol, poly(tetramethylene ether) glycol of number-average molecular weight 988. The amounts of each monomer in each polymerization are shown in Table III. There were employed in each polymerization 0.6 g of antioxidant and 0.2 ml of neat catalyst.

The resin kettles were initially placed in baths at about 250° C. which were then heated to about 270° C. over a period of about 80 minutes. The kettles were then evacuated to a pressure of 14 Pa or less. The polymerizations were continued for a period of 14 to 29 min at about 270° C. and 14 Pa or less before the polyetheresterimide products were recovered.

The polymer test slabs were compression molded at 260° C. The properties of the polymers are listed in Table III.

TABLE III

Polyetheresterimide Polymers Based on Bis(4-aminocyclohexyl)methane (70%-trans, trans)

| Polymer | G | H | I | J |
|---|---|---|---|---|
| Monomer | | | | |

TABLE III-continued

Polyetheresterimide Polymers Based on Bis(4-aminocyclohexyl)methane (70%-trans, trans)

| Polymer | G | H | I | J |
|---|---|---|---|---|
| Diimide-diester, moles | 0.1 | 0.105 | 0.1138 | 0.12 |
| Polyether glycol, moles | 0.08 | 0.07 | 0.065 | 0.06 |
| Short/Long Chain Esterimide Unit Ratio | 0.25 | 0.5 | 0.75 | 1.0 |
| Polymer Properties | | | | |
| Inherent viscosity, dL/g | 1.51 | 1.61 | 1.29 | 1.14 |
| $M_{100}$, MPa | 5.7 | 6.3 | 7.8 | 9.1 |
| $M_{300}$, MPa | 4.8 | 5.7 | 7.5 | 9.6 |
| Tensile strength MPa | 7.0 | 10.0 | 15.2 | 15.5 |
| Elongation, % | 850 | 710 | 690 | 595 |
| Permanent set, % | 105 | 47 | 37 | 47 |
| Shore A hardness | 87 | 89 | — | — |
| Shore D hardness | 37 | 41 | 45 | 52 |
| Softening temperature, °C. | 148–154 | 160–170 | 183–188 | 197–200 |
| Volume swell ASTM #3 oil | | | | |
| 7 days/100° C. | 59 | 56 | 46 | 38 |
| 7 days/150° C. | 95 | 89 | 67 | 58 |

Polymers H, I and J do not scuff. Polymer G which softens below 160° C. has a short/long chain esterimide unit ratio of 0.25 which is outside the scope of this invention.

What is claimed is:

1. A thermoplastic elastomeric polyetheresterimide comprising a multiplicity of long chain esterimide units being represented by the formula

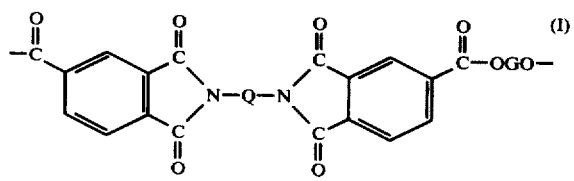

and short chain esterimide units being represented by the formula

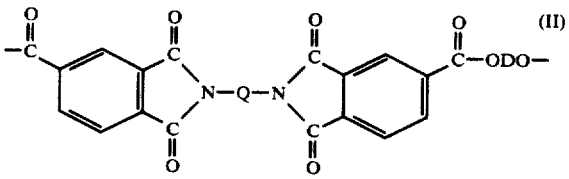

where G is a divalent radical remaining after the removal of terminal hydroxyl groups from a poly(alkylene oxide)glycol having a number average molecular weight of about 400–4000; D is a divalent radical remaining after removal of hydroxyl groups from a diol having a molecular weight less than about 300 and Q is a divalent radical remaining after removal of amino groups from an aliphatic primary diamine having a molecular weight of less than 350; with the provisos that from about 0.5 to 5 of said short chain esterimide units are present for each of said long chain esterimide units and that said polyetheresterimide has a softening point of at least 160° C.

2. A polyetheresterimide of claim 1 having a softening point of at least 180° C.

3. A polyetheresterimide of claims 1 or 2 wherein the divalent radical Q is derived from ethylene diamine or bis(4-aminocyclohexyl)methane.

4. A polyetheresterimide of claims 1 or 2 wherein the divalent radical D is derived from ethylene glycol, 1,2-propylene glycol or 1,4-butanediol.

5. A polyetheresterimide of claims 1 or 2 wherein the divalent radical G is derived from poly(tetramethylene oxide) glycol having a number average molecular weight of 600–2200 or ethylene oxide-capped poly(propylene oxide) glycol having a number average molecular weight of 600–2800 and containing 5–35% by weight ethylene oxide.

6. A polyetheresterimide of claims 1 or 2 wherein the divalent radical Q is derived from ethylene diamine, the divalent radical D is derived from ethylene glycol and the divalent radical G is derived from poly(tetramethylene oxide) glycol having a number average molecular weight of 600–2200.

7. Process for the preparation of the polyetheresterimide of claims 1 or 2 by melt condensation of a mixture of trimellitic anhydride, a primary aliphatic diamine, a poly(alkylene oxide) glycol and a molar excess of a low molecular weight diol, said trimellitic anhydride and said diamine being present in a molar ratio of 2.0:0.85 to 2.0:1.15.

* * * * *